Inventors
Dennis Wilde
Ronald Kenworthy

By Morrison, Kennedy & Campbell
Attorneys

Aug. 6, 1968  D. WILDE ET AL  3,395,943

METHODS OF AND APPARATUS FOR CARRYING GLASS SHEETS

Filed Oct. 11, 1966  2 Sheets-Sheet 2

Inventors
Dennis Wilde
Ronald Kenworthy
By
Morrison, Kennedy & Campbell
Attorneys 3,395,943
METHODS OF AND APPARATUS FOR
CARRYING GLASS SHEETS
Dennis Wilde, Hoscar, near Ormskirk, and Ronald Kenworthy, Ormskirk, England, assignors to Pilkington Brothers Limited, Liverpool, Lancashire, England, a corporation of Great Britain
Filed Oct. 11, 1966, Ser. No. 585,984
Claims priority, application Great Britain, Oct. 22, 1965, 44,898
13 Claims. (Cl. 302—31)

ABSTRACT OF THE DISCLOSURE

Sheets of glass are transported along a gaseous support by a translational gaseous flow applied to the glass in the general direction of advance of the glass, and opposed guiding forces are applied to the glass by directing at the glass opposed gaseous streams from either side of the path of travel.

---

This invention relates to methods of and apparatus for carrying glass sheets.

The main object of the present invention is to avoid contact of the surface of the glass with a solid object whilst the glass sheet is moving in an intended path of travel so that a glass sheet which is being moved may be in a plastic state, at least in some part of its travel, and will not suffer surface marking or other deformation through contact of the glass sheet with a solid body.

Another main object of the present invention is to maintain substantial uniformity of support over the surface area of each of the glass sheets so that the glass retains its form whilst it moves in the intended path.

The present invention provides a method of transporting glass in sheet form along an intended path of travel consisting in maintaining a gaseous support under a surface of the glass as it is advanced in its intended path of travel and locating the glass in the said path by directing gaseous streams against the exposed periphery of the glass capable of developing forces transversely of the sheet.

Further in accordance with the present invention, there is provided a method of carrying glass while in face downward transition along a path consisting in continually creating a gaseous film under the glass to support the glass as it is advanced, by delivering gas along the path at a pressure sufficient to provide support in the film for the glass and extracting the gas under the glass at intervals to provide a continuous support from the film for the glass as the glass is advanced, locating the glass in the intended path of travel by directing transverse gaseous streams against an edge of the glass travelling along the path.

The present invention comprehends a method of carrying glass while in face downward transition along a path, consisting in continually creating a gaseous film under the glass as it is advanced by delivering gas at regular intervals along the path at a pressure sufficient to provide support in the film for the glass, and extracting the gas under the glass at alternating intervals to ensure a continuous support from the film for the glass as it is advanced, and locating the glass in the intended path of travel by gaseous transverse streams directed in a sense normal to the direction of the path of travel to react on an edge of the glass travelling along the path.

According to another aspect of the present invention, the gas which is delivered to form the film under the glass is gas which is diffused into the film through the pores of a porous material, and a substantial uniformity of pressure in the gaseous film under the glass is achieved by venting gas from the film at positions uniformly spaced over the whole undersurface of the gaseous film which is supporting the glass.

The method of forming the gaseous film by diffusing gas into the film has application in the heating stage of a process in which a glass sheet is heated to a temperature near the softening point of the glass as a preliminary to another operation, for example, the coating of the glass sheet, the quenching of the glass sheet to toughen it or the imposition of a desired curvature on the glass sheet to bend it. The creation of the gaseous film by diffusion of gas into the film has the advantage that the glass sheet may be maintained stationary on the gaseous film while the glass sheet is heated, without the surface of the glass sheet being harmfully dimpled.

Alternatively, according to still another aspect of the present invention, the gaseous film is created by gas streams emanating from a common plenum body of the gas, and a substantial uniformity of pressure in the gaseous film under the glass is achieved by venting gas from the film at positions uniformly spaced over the whole undersurface of the film beneath the glass.

This alternative method of creating the gaseous film under the glass may be used to create a film of cold gas to chill the glass during the quenching stage of a toughening process as well as to create a gaseous film during a heating stage of a process for treatment of the glass, and deformation of the surfaces of the glass by dimpling may be avoided provided that the glass sheet is kept moving continually in relation to the gas streams supplying gas to the film.

Conveniently in any treatment process the glass sheet is kept moving continuously over a gaseous film while the glass is heated and subjected to a subsequent treatment, and the intended path of travel is thus a path through a heating zone and a following treatment zone, for example, a bending or quenching zone. The glass sheet may be maintained in the intended path of travel by directing opposed gaseous transverse streams at an edge of the glass sheet, for example, in a sense normal to the direction of the path of travel, so that the glass sheet is guided in a path between the opposed gaseous transverse streams.

Alternatively, however, there may be transverse streams directed in a sense normal to the direction of the path of travel and in one direction only. In this method of operation, the glass sheet has an edge oriented into a position to have the sense of the intended path of travel and the film is tilted to maintain the glass in transverse equilibrium, with the glass partially supported by the transverse streams generated adjacent the said edge of the glass sheet. The location of the glass sheet in the intended path of travel according to this alternative method of operation in accordance with the present invention is achieved by the combination of the gravitational force imposed transverse to the glass sheet by the tilting of the gaseous film and the action of the transverse streams directed in one direction only against the edge of the glass sheet.

Advantageously the transverse streams are directed at the edge of the glass sheet in the plane of the glass sheet, but alternatively the transverse streams may be streams directed at the edge of the glass sheet at an angle to the plane of the glass sheet, provided that the gaseous streams have a component transverse to the intended path of travel of the glass sheet sufficient to locate the glass sheet in that path of travel.

Desirably the movement of the glass sheet on the gaseous film is achieved by the action of gaseous flow on the glass sheet to cause the glass sheet to move along the intended path of travel in which it is located by the gaseous transverse streams.

In a method of treating glass sheets in accordance with the invention, a succession of glass sheets is advantageously advanced through the treating zones and the sheets of glass are maintained in prescribed spaced relation while moving face downwards on their respective films in the intended path of travel, the transition of the glass sheets being imposed by a gaseous flow directed at each individual sheet during the transition.

Advantageously, the gaseous flow which is directed at the glass sheet to advance it may be manipulated to maintain the pristine orientation of the glass on the gaseous film with respect to its intended path of travel.

The gaseous flow acting to move the glass sheets may be a series of sweeping gas flows from above and inclined down on the succession of glass sheets in the direction of the intended path of travel so that the glass sheet is moved by one gas flow to the next. When glass sheets are advanced in this way, however, it has been found that the glass sheets tend to gather momentum very quickly owing to the extremely low frictional force existing between the glass sheet and the supporting gaseous film, if the gaseous film is exactly horizontal and no other forces are applied to the glass sheet in the direction of its path of travel. Accordingly, it is preferred for a braking force in the opposite direction to the intended path of travel to be applied to each glass sheet to keep it under control. Such a braking force may be a retarding force delivered from the plate beneath the glass, but it is preferred for the intended path of travel to be at a small angle, for example, about ¼ or ½ a degree to the horizontal so that the braking force is gravitational and a controlled movement of the sheets in the intended path of travel is obtained.

Alternatively the gaseous flow directed at the glass to move it in the intended path of travel may be a substantially horizontal force acting on at least a part of the trailing edge of the glass sheet in a manner to maintain the pristine orientation of the glass supported on the film relative to the direction of displacement. Advantageously the delivery means in this alternative is advanced along the intended path of travel behind the advancing glass sheet (for example directing gas onto the trailing edge of a rectangular glass sheet), and the braking force may be exerted on the glass sheet by the action of gravity due to the inclination of the intended path of travel and of the gaseous film at an angle of about ¼ of a degree to the horizontal.

According to this aspect of the invention therefore there is provided a method of transporting glass in sheet form along an intended path of travel consisting in maintaining a gaseous support under a surface of the glass as it is advanced in its intended path of travel, impelling a glass sheet by constantly chasing the sheet by gaseous streams directed on to the glass, and locating the glass in the said path by directing gaseous streams against the exposed periphery of the glass capable of developing forces transversely of the glass sheet.

The present invention further comprehends apparatus for carrying glass while in face downward transition along a path, comprising, in combination, a substantially continuous bed arranged in the direction of the path and having gas outlets for delivering gas, a header for maintaining a common plenum body of gas and for supplying gas at a common pressure to said gas outlets so that gas is delivered through the said gas outlets along the said path at a pressure sufficient to form and maintain a gas film for supporting the glass above the bed, said bed also having exhaust outlets at intervals spaced over the whole area of the bed to permit the release of gas from the gas film beneath the glass and thereby provide a continuous support from the film for the glass as it is advanced along the path of travel, and at least one guide chamber extending parallel to the path of travel and having directing means for directing gas from the guide chamber in a sense normal to the direction of the path of travel to react on an edge of the glass travelling along the path.

According to this aspect the present invention also comprehends apparatus for carrying glass while in face downward transition along a path, comprising, in combination, a substantially continuous bed arranged in the direction of the path and having gas outlets at regular intervals therein, a header for maintaining a common plenum body of gas and for supplying gas at a common pressure to said gas outlets so that gas is delivered at regular intervals along the path at a pressure sufficient to form and maintain a continuous gas film for supporting the glass above the bed, said bed also having exhaust outlets at intervals alternating with said gas outlets to ensure a continuous support from the film for the glass as it is advanced along the path of travel, and at least one guide chamber extending parallel to the path of travel and have directing means for directing as from the guide chamber in a sense normal to the direction of the path of travel to react on an edge of the glass travelling along the path.

The substantially continuous bed may comprise a porous sheet, the pores of which constitute the gas outlets, or alternatively the substantially continuous bed may comprise a plate having located therein tubes communicating with said header and arranged to constitute gas outlets in the bed. As already indicated either form of bed may be tilted at an angle to the horizontal in a direction transverse to the intended path of travel.

Advantageously opposed guide chambers extending parallel to the path of travel may be provided for directing gas from the guide chambers to react on an edge of the glass travelling along the path.

Preferably means is provided for directing a gaseous flow at the glass to impose a transition on the glass, and desirably the said means is adapted to direct on the glass a gaseous flow which maintains the pristine orientation of the glass on the film relative to the direction of displacement during the transition.

When a gaseous flow is used to impose the transition on the glass, the substantially continuous bed is preferably inclined upwardly at an angle of not more than half a degree to the horizontal in the direction of the intended path of travel, whereby the imposed transition in the intended path of travel is controlled.

The present invention still further comprehends, for use in apparatus for carrying glass while in face downward transition along a path, a substantially continuous bed comprising a porous sheet, the pores of which constitute gas outlets, the porous sheet having exhaust outlets at intervals therein, and a header for supplying gas from a common plenum body of gas in said header to said pores in the porous sheet.

In order that the invention may be more clearly understood, the following description is made purely by way of example of preferred embodiments thereof, with reference to the accompanying diagrammatic drawings in which.

In the drawings, like reference numerals designate the same or similar parts.

Figure 1:
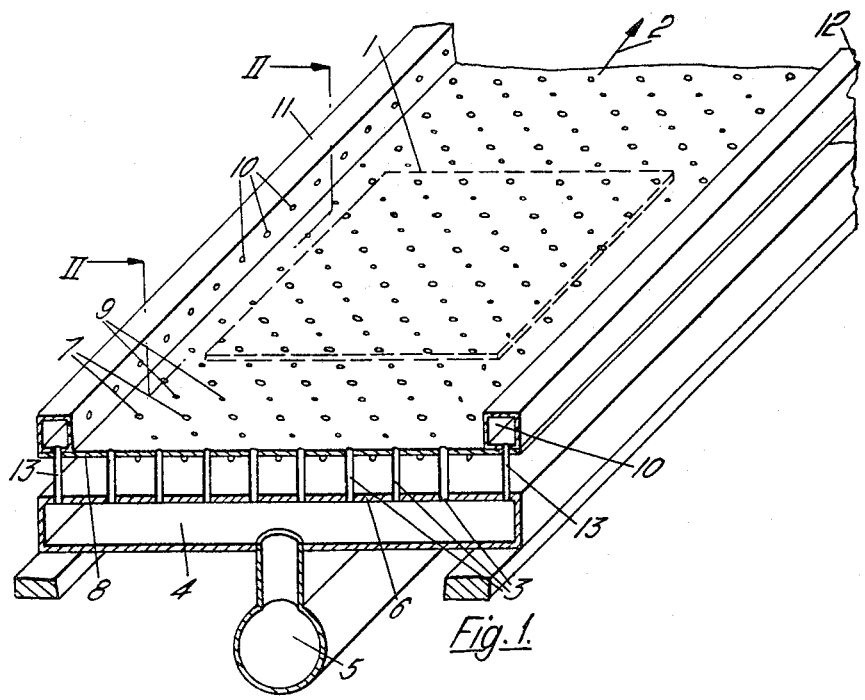
FIG. 1 shows in elevation and in part section one embodiment of apparatus for carrying out the method of the present invention, but with the means for delivering a gas flow to advance the glass in the intended path of travel omitted.

Referring first to FIG. 1 of the drawings, there is indicated by the broken line 1 a glass sheet disposed in face downward position supported on a continuous gaseous film created under the sheet by delivering gas at regular intervals, along the intended path of travel 2 of the glass sheet 1, through spaced rows of gas tubes 3 at a pressure sufficient to provide support in the film for the glass sheet 1.

A header 4 is continually supplied with gas by a gas supply line 5 and the header 4 communicates through the tubes 3 which are located with their lower ends in the upper surface 6 of the header 4 and with their upper ends located in apertures 7 in a plate 8 constituting a bed over which the gaseous film is formed under the glass sheet 1 wherever it may be. The gas supplied to the header 4 from the gas supply line 5 forms in the header 4 a common plenum body of gas which is supplied to each of the tubes 3 so that gas passes through the tubes 3 and emanates as gas streams through apertures 7.

The plate 8 constituting the bed over which the gaseous film is formed has another series of apertures 9 at alternating intervals with the apertures 7 and these apertures 9 communicate directly through the plate 8 to the space between the plate 8 and the upper surface 6 of the header 4. The apertures 9 act as exhaust apertures through which gas from the gaseous film passes to ensure that there is no substantial build-up of pressure beneath the glass sheet and a substantially uniform support for the glass sheet 1 from the gaseous film is ensured.

The gas which is extracted from the gaseous film by passage through exhaust apertures 9 to the space between the plate 8 and the upper surface 6 of the header 4 is therefore able to disperse in all directions between the tubes 3 extending between the plate 8 and the upper surface 6 of the header 4.

The glass sheet 1 is located in the intended path of travel by opposed gaseous transverse streams directed in a sense normal to the direction of the path of travel from apertures 10 in guide chambers 11 and 12 extending parallel to the path of travel 2 of the glass sheet on the gaseous film.

The header 4 supplies gas to the gas chambers 11 and 12 through tubes 13 located with one end in the upper surface 6 of the header 4 and with their other ends in the floor of the chambers 11 and 12 respectively.

Figure 2:
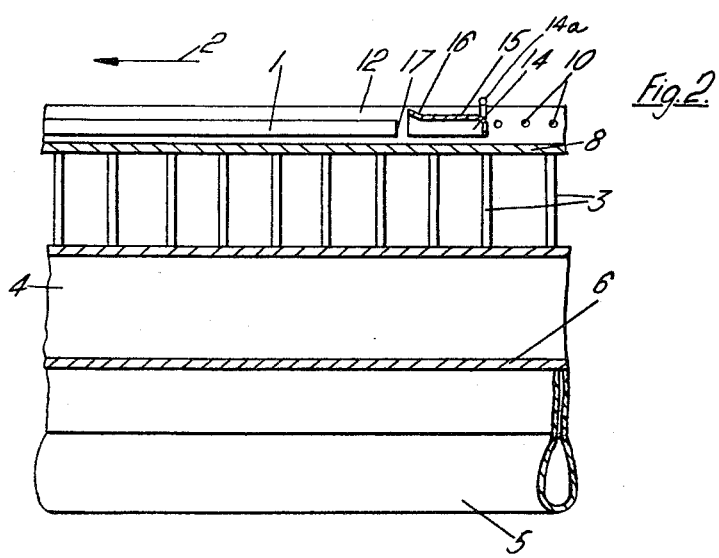
FIG. 2 is a sectional view along the lines II—II of FIG. 1 but showing additionally means for delivering a gas flow to advance the glass sheet in the intended path of travel.

The gaseous transverse streams from the apertures 10 in the opposed guide chambers 11 and 12 each react on an edge of the glass sheeet 1 on the film and locate the glass sheet 1 in the intended path of travel 2 as the glass sheet is moved on the gaseous film in the manner about to be described, with reference to FIG. 2.

Referring now to FIG. 2, there is shown immediately behind the glass sheet 1 and also over the apertures in the plate 8 a member 14 having a roof 15 and three walls, there being no leading wall and the member having no base. An upwardly inclined extension 16 to the roof 15 of the member 14 causes gas entering the member from the apertures 7 in the plate 8 to be directed forwardly against the trailing edge of the glass sheet 1. These directed gas streams maintain the pristine orientation of the glass with respect to the direction of displacement.

To advance the glass sheet 1 on the gaseous film, the member 14 is moved, by means of a handle 14a, towards the trailing edge 17 of the glass sheet 1 so that a greater force is exerted by the gaseous flow from the apertures 16 on the trailing edge 17 of the glass sheet 1, and the glass sheet 1 is caused to advance. Continuous motion of the member 14 from right to left as seen in FIG. 2 will cause a continuous advance of the glass sheet 1 which is controlled by the gravitational force arising from the plate 8 being located at a very small angle, less than ½ of a degree, to the horizontal so that the gaseous film which is established by the presence of the sheet is inclined at a similar angle to the horizontal in the direction of the intended path of travel 2.

Figure 3:
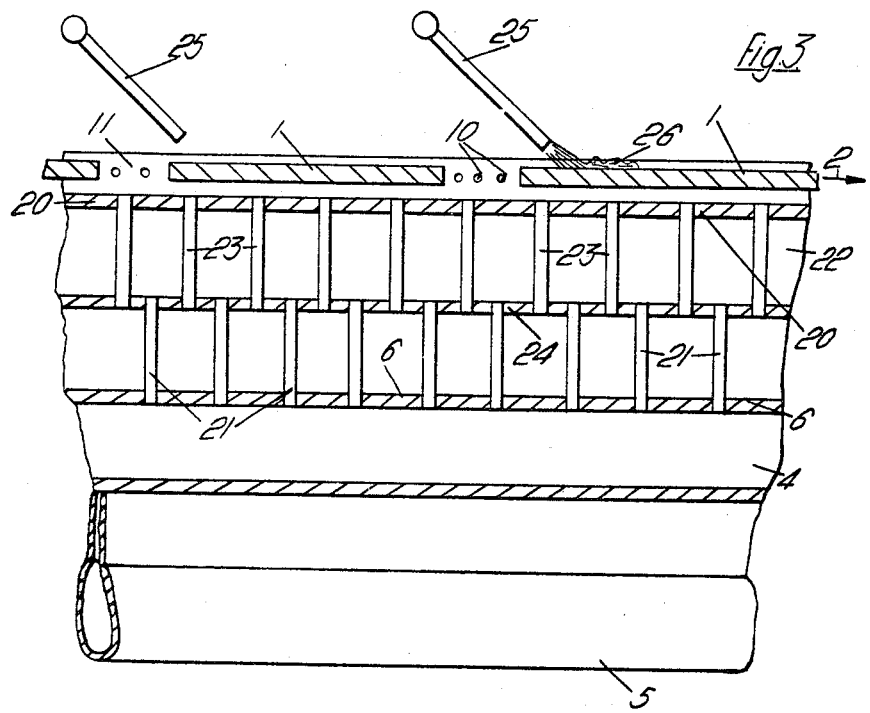
FIG. 3 is a sectional view of an alternative apparatus for carrying out the method of the present invention.

In FIG. 3 of the accompanying drawings, there is shown an alternative apparatus for carrying out the method of the present invention.

FIG. 3 is a side sectional view of the alternative apparatus for carrying out a method according to the present invention, in which the gaseous film under the glass is continually created by delivering gas at regular intervals by diffusion through the pores of a porous sheet 20. Preferably the porous sheet 20 used is comprised of successive layers of metal mesh.

Gas is supplied at uniform pressure to the porous sheet 20 from a gas supply line 5 to a header 4. Individual tubes 21 are located over the whole area of the upper surface 6 of the header 4, and these tubes 21 supply gas to a gas chamber 22 which maintains a substantially uniform pressure against the whole surface of the porous sheet 20 so that gas diffuses through the porous sheet 20 to form a gaseous film immediately under a glass sheet 1.

Because of the existence of the gas chamber 22 immediately under the porous sheet 20, the exhausting of gas at alternating regular intervals is accomplished through tubes 23 which extend through the gas chamber 22 but do not communicate therewith so that the exhaust gas from the gaseous film is emitted into the space between the floor 24 of the gas chamber 22 and the upper surface 6 of the header 4. The exhaust gas is able to escape in all directions between the tubes 21.

In the embodiment of the invention described in FIG. 3, an alternative method of advancing the glass by gaseous flow is shown and gas nozzles 25 angled to the path of intended travel 2 of the glass sheet 1 are shown for emitting gas on to the upper surface of the glass sheet 1 to advance it, a gravitational braking force being also used to control the advance in the manner already described in connection with FIGS. 1 and 2. The way in which the gaseous flow to advance the glass sheet impinges on the upper surface of the glass sheet 1 is indicated diagrammatically at 26.

In FIG. 3 of the drawings, which is a side sectional view, only one gas nozzle 25 is shown at each position along the intended path of travel, but, in practice, there will be several such gas nozzles arranged in a row transversely to the intended path of travel of the glass sheet 1. The operation of the gas nozzles 25 is controlled in accordance with the shape of the glass sheet being advanced on the gaseous film in such a way that the action of the gas nozzles to advance the glass sheet maintains the pristine orientation of the glass sheets 1 as they are moved in the intended path of travel 2.

Figure 4:
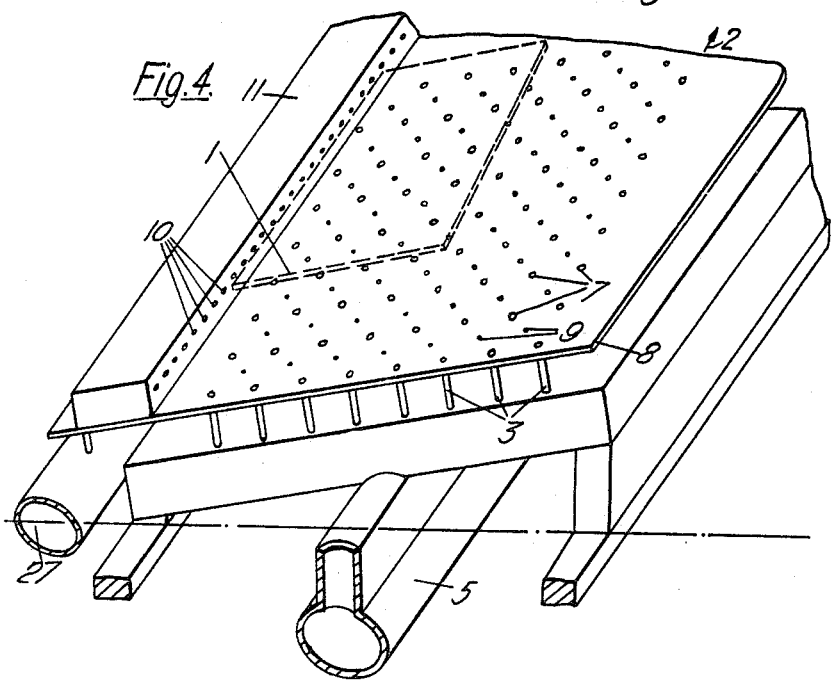
FIG. 4 is an elevational view of a still further embodiment of apparatus for carrying out the method of the present invention.

The location of the glass sheet in the intended path of travel by gaseous transverse streams directed in a sense normal to the direction of the path of travel to react on one edge only of the glass sheet travelling on its supporting film is carried out in accordance with the embodiment of the invention illustrated in FIG. 4 by tilting this supported glass slightly with respect to the horizontal and transversely to the intended path of travel 2. This is achieved by tilting the plate 8 which constitutes the bed over which the gaseous film is formed under the glass sheet 1 in accordance with the embodiment of FIG. 1, and the tilted bed is shown in FIG. 4. The effect of tilting the plate 8 constituting the bed is that the glass sheet 1 is maintained in transverse equilibrium with the glass partially supported on the transverse streams generated adjacent to said edge of the glass, which transverse streams are directed in a sense normal to the direction of the path of travel 2 from the apertures 10.

In the apparatus illustrated in FIG. 4, the gas is supplied to the gas chamber 11, which constitutes the side guide, from a separate gas supply line 27 via a header if desired. In this way gas can be supplied at different pressures to the apertures 7 in the plate 8 on the one hand and the apertures 10 in the gas chamber 11 on the other hand.

By the use of the method and apparatus described in the embodiments of the invention, a glass sheet may be heated to a temperature near its softening point without any contact of the glass sheet with a solid body, and deformity of the glass sheet by contact with solid bodies is thereby avoided.

The method and apparatus according to the invention have particular advantage in carrying out a toughening process and glass sheets may be toughened in succession without the surfaces of the glass sheet being deformed, for example by tong marks, as is customary in conventional processes.

Although the invention has been described in connection with the advance along an intended path of flat glass sheets, it will be understood that curved glass sheets may be similarly conveyed on a gaseous film over a bed shaped to correspond with the curvature of the glass sheet to be advanced.

It will be appreciated from the foregoing that two different kinds of forces are applied to the glass. The first is a translational force applied to the supported glass to advance it in said path. This translational force is genertaed either by the use of the member 14 which directs gas flow forwardly against the trailing edge of the glass sheet 1 or by means of the gas nozzles 25 illustrated in FIGURE 3 which provide gas flows angled to the path of intended travel of the glass against the upper surface of the glass sheets to advance it in the direction of its path of travel. Other forces applied to the glass are the forces for laterally locating the glass in its path of travel and these forces are provided by opposed gaseous streams directed from either side of the path of travel in a sense normal to the path of travel of the glass. These opposed gaseous streams are directed towards each other from either side of the path of travel through the holes 10 in the guide chambers 11 and 12 extending parallel to the path of travel of the sheet and by these means there are developed opposed guiding forces acting on the sheet transversely of the path.

We claim:

1. Method of transporting glass in sheet form along an intended path of travel comprising providing a supporting force for the glass sheet in the form of gaseous streams ejected in a sense normal to the plane of the glass, providing two normal opposing forces at least one of which is in gaseous-stream form for maintaining the lateral position of the sheet, and deflecting a portion of the flow from the first-mentioned gaseous streams to a flow toward the rear edge of the glass sheet to propel the glass sheet forwardly.

2. A method as in claim 1 wherein both of said normal opposing forces are in gaseous-stream form.

3. A method as in claim 1 wherein one of the normal opposing forces is gravity induced by support of the glass at an acute angle to the horizontal.

4. A method as in claim 1 wherein the supporting force for the glass is in the form of a film into which gas is diffused and a substantial uniformity of pressure in the film under the glass is achieved by venting gas from the film at positions uniformly spaced over the whole undersurface of the film.

5. A method as in claim 4 wherein the gaseous streams of the supporting force emanate from a common plenum body of gas.

6. A method as in claim 1 wherein a plurality of sheets of glass are thus supported in prescribed spaced relation, and a portion of the first-mentioned gaseous streams is deflected against each to propel it forwardly.

7. Apparatus for carrying a sheet of glass while in a face-downward position along a path comprising means for directing gaseous streams upwardly from a bed in a sense normal to the face of the glass sheet to support the sheet for movement forwardly thereover, means for providing two normal opposing forces at least one of which is in gaseous-stream form for maintaining the lateral position of the sheet, and a deflector open at the front to deflect a portion of the upwardly-directed gas to propel the glass sheet forwardly.

8. Apparatus as in claim 7 wherein both said normal opposing forces are in gaseous-stream form.

9. Apparatus as in claim 7 wherein one of said normal opposing forces is in gaseous-stream form and the other thereof is provided by means supporting the bed tilted at an angle to the horizontal in a direction transverse of the intended path of travel and toward said wall.

10. Apparatus as in claim 7 wherein said bed is substantially continuous in the direction of said path and has gas outlets for delivering gas, and there is provided a header for maintaining a common plenum body of gas and for supplying gas at a common pressure to said gas outlets so that gas is delivered through the said path at a pressure sufficient to form and maintain a gas film for supporting the glass above the bed, said bed also having exhaust outlets at intervals spaced over the whole area of the bed to permit the release of gas from the gas film beneath the glass and thereby provide a continuous support from the film for the glass as it is advanced along the path of travel, and wherein the second-mentioned means comprises at least one guide chamber extending parallel to and alongside the path of travel and having directing means for directing gas from the guide chamber in a sense normal to the direction of the path of travel to react on an edge of the glass travelling along the path.

11. Apparatus as in claim 7 wherein said bed is substantially continuous in the direction of said path and has gas outlets for delivering gas at regular intervals therein and there is provided a header for maintaining a common plenum body of gas and for supplying gas at a common pressure to said gas outlets so that gas is delivered at regular intervals along the path at a pressure sufficient to form and maintain a continuous gas film for supporting the glass above the bed, said bed also having exhaust outlets at intervals alternating with said gas outlets to ensure a continuous support from the film for the glass as it is advanced along the path of travel and wherein the second-mentioned means comprises at least one guide chamber extending parallel to and alongside the path of travel and having directing means for directing gas from the guide chamber in a sense normal to the direction of the path of travel to react on an edge of the glass travelling along the path.

12. Apparatus according to claim 10, wherein the substantially continuous bed comprises a porous sheet the pores of which constitute the gas outlets.

13. Apparatus as set forth in claim 10 wherein the bed comprises a porous sheet, the pores of which constitute gas outlets, the porous sheet having exhaust outlets at intervals therein, and wherein the header is arranged to supply gas from a common plenum body of gas in said header to said pores in the porous sheet.

References Cited

UNITED STATES PATENTS

| | | | |
|---|---|---|---|
| 1,971,853 | 8/1934 | Ihlefeldt | 302—31 X |
| 2,308,038 | 1/1943 | Ashlock. | |
| 2,678,237 | 5/1954 | Allander et al. | 302—31 |
| 2,805,898 | 9/1957 | Willis | 302—29 |
| 2,848,820 | 8/1958 | Wallin et al. | 302—29 X |
| 3,060,590 | 10/1962 | Brown. | |
| 3,070,901 | 11/1963 | Allander et al. | |
| 3,180,688 | 4/1965 | Futer | 302—29 |
| 3,229,377 | 1/1966 | Hoyt | 302—29 X |
| 3,250,573 | 5/1966 | Clarke et al. | 302—29 |
| 3,272,415 | 9/1966 | Wallin | 302—29 X |

EVON C. BLUNK, *Primary Examiner.*

M. L. AJEMAN, *Assistant Examiner.*